(12) United States Patent
Shigeta

(10) Patent No.: US 12,318,682 B2
(45) Date of Patent: Jun. 3, 2025

(54) TRADING CARD PACKAGE AND MANUFACTURING METHOD FOR SAME

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

(21) Appl. No.: 16/295,023

(22) Filed: Mar. 7, 2019

(65) Prior Publication Data
US 2019/0275407 A1    Sep. 12, 2019

(30) Foreign Application Priority Data
Mar. 11, 2018    (JP) .................................. 2018-063103

(51) Int. Cl.
*A63F 1/06* (2006.01)
*A63F 1/02* (2006.01)
(Continued)

(52) U.S. Cl.
CPC ................ *A63F 1/062* (2013.01); *A63F 1/02* (2013.01); *B42D 15/02* (2013.01); *B65B 61/26* (2013.01); *G09F 1/02* (2013.01); *A63F 2001/022* (2013.01); *A63F 2009/2439* (2013.01); *B65B 35/44* (2013.01); *B65B 2220/16* (2013.01); *G06F 16/211* (2019.01)

(58) Field of Classification Search
CPC ....... A63F 1/02; A63F 1/062; G06Q 10/0875; G06Q 10/087; G06Q 20/10

USPC .......................................................... 273/292
See application file for complete search history.

(56) References Cited

U.S. PATENT DOCUMENTS

| | | |
|---|---|---|
| 4,905,828 A | 3/1990 | Dods |
| 9,724,594 B2 * | 8/2017 | Shigeta .................. A63F 1/062 |

(Continued)

FOREIGN PATENT DOCUMENTS

| | | |
|---|---|---|
| AU | 2008330607 B2 | 6/2009 |
| AU | 2017254969 A1 | 11/2017 |

(Continued)

OTHER PUBLICATIONS

Pokémon Fossil Booster Box, All Pages, Jun. 2, 2016 (Year: 2016).*

(Continued)

*Primary Examiner* — Jeffrey S Vanderveen
(74) *Attorney, Agent, or Firm* — NORTON ROSE FULBRIGHT US LLP

(57) ABSTRACT

Provided is a trading card in which a trading card package and content of the trading card package are linked and the content can be specified, and an illegal act can be found. A manufacturing method for a trading card package includes a step of grouping trading cards on which rareness degree information is printed and a step of packaging the grouped trading cards. Trading card IDs are imparted to the trading cards. In the grouping step, the trading card IDs are registered in a database. A package ID is imparted to a package. The package ID is enclosed in the package or provided on the package. The package ID of the package including the trading cards, the trading card IDs, and the rareness degrees included in the package are associated.

18 Claims, 4 Drawing Sheets

(51) Int. Cl.
*A63F 9/24* (2006.01)
*B42D 15/02* (2006.01)
*B65B 35/44* (2006.01)
*B65B 61/26* (2006.01)
*G06F 16/21* (2019.01)
*G09F 1/02* (2006.01)

(56) References Cited

U.S. PATENT DOCUMENTS

| | | | | |
|---|---|---|---|---|
| 2002/0152141 | A1* | 10/2002 | Carter | G06Q 10/087 705/29 |
| 2002/0165794 | A1* | 11/2002 | Ishihara | G06Q 10/0875 705/27.1 |
| 2010/0071831 | A1 | 3/2010 | Peters et al. | |
| 2010/0327525 | A1 | 12/2010 | Shigeta | |
| 2011/0079959 | A1 | 4/2011 | Hartley | |
| 2014/0033660 | A1* | 2/2014 | Shigeta | B65D 5/54 206/315.1 |
| 2014/0309006 | A1 | 10/2014 | Shigeta | |
| 2014/0353913 | A1 | 12/2014 | Shigeta | |
| 2017/0106270 | A1 | 4/2017 | Shigeta | |
| 2018/0050262 | A1 | 2/2018 | Shigeta | |

FOREIGN PATENT DOCUMENTS

| | | |
|---|---|---|
| CN | 101541555 A | 9/2009 |
| CN | 103143162 A | 6/2013 |
| CN | 103287637 A | 9/2013 |
| CN | 103566578 A | 2/2014 |
| CN | 105935490 A | 9/2016 |
| EP | 3269432 A1 | 1/2018 |
| JP | H11-011450 A | 1/1999 |
| JP | 2001312602 A | 11/2001 |
| JP | 2002046375 A | 2/2002 |
| JP | 2002-288458 A | 10/2002 |
| JP | 2003-300532 A | 10/2003 |
| JP | 2004151867 A | 5/2004 |
| JP | 2007215705 A | 8/2007 |
| JP | 3-186982 U | 10/2013 |
| JP | 2017-132514 A | 8/2017 |

OTHER PUBLICATIONS

European Search Report dated Jul. 9, 2019 issued in corresponding EP Application 19161653.1.
International Search Report dated May 28, 2019 issued in corresponding PCT Application PCT/JP2019/009002.
Chinese Office Action dated Aug. 31, 2021 issued in CN Application No. 201910179180.7.
US Office Action dated Aug. 21, 2023 issued for U.S. Appl. No. 16/979,642.
Chinese Office Action dated Sep. 29, 2023 issued for CN Application No. 201980018374.7.
Japanese Office Action dated Feb. 6, 2024 issued for JP Application No. 2023-026006.
US Office Action dated Dec. 18, 2024 issued for U.S. Appl. No. 16/979,642.

* cited by examiner

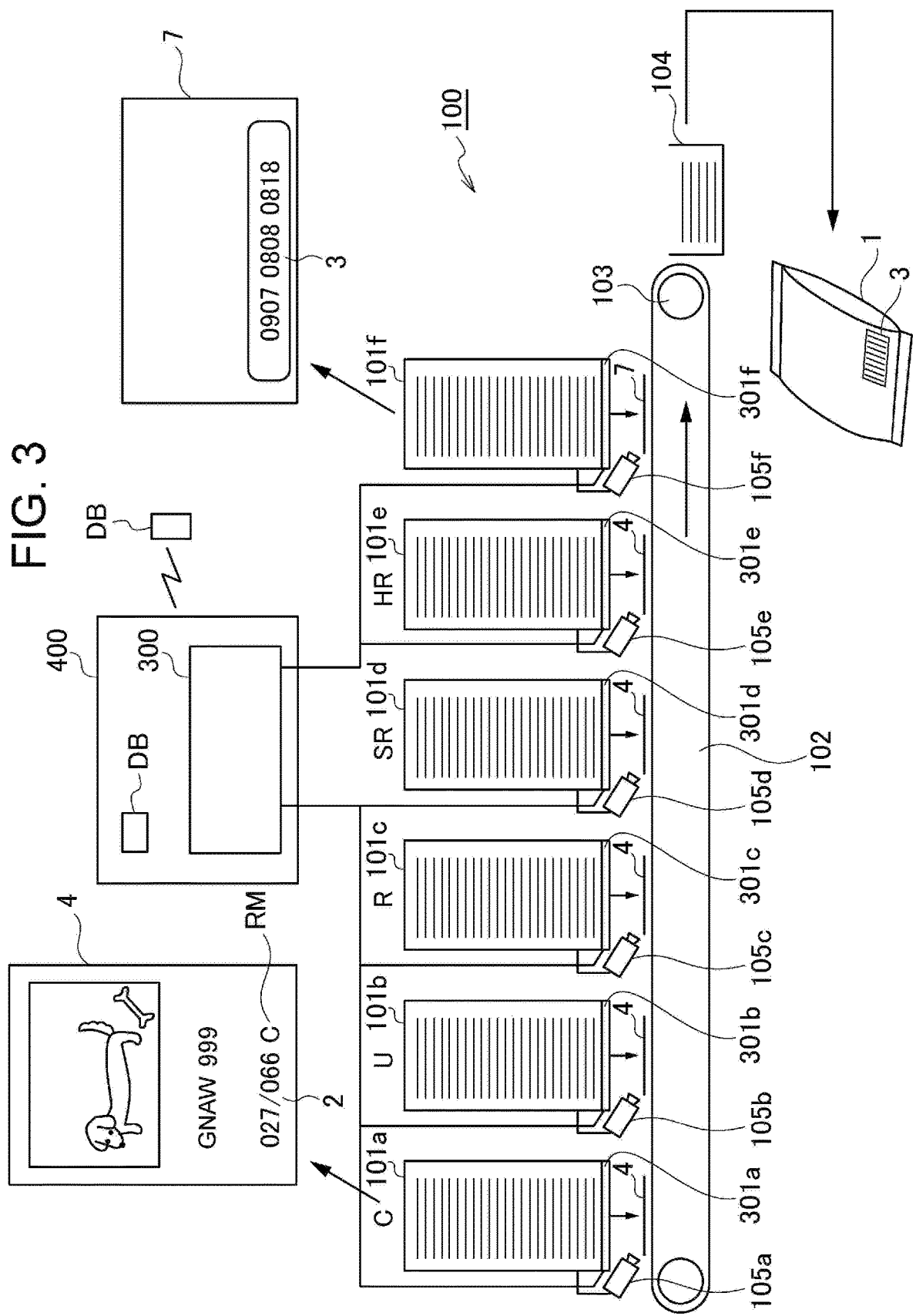

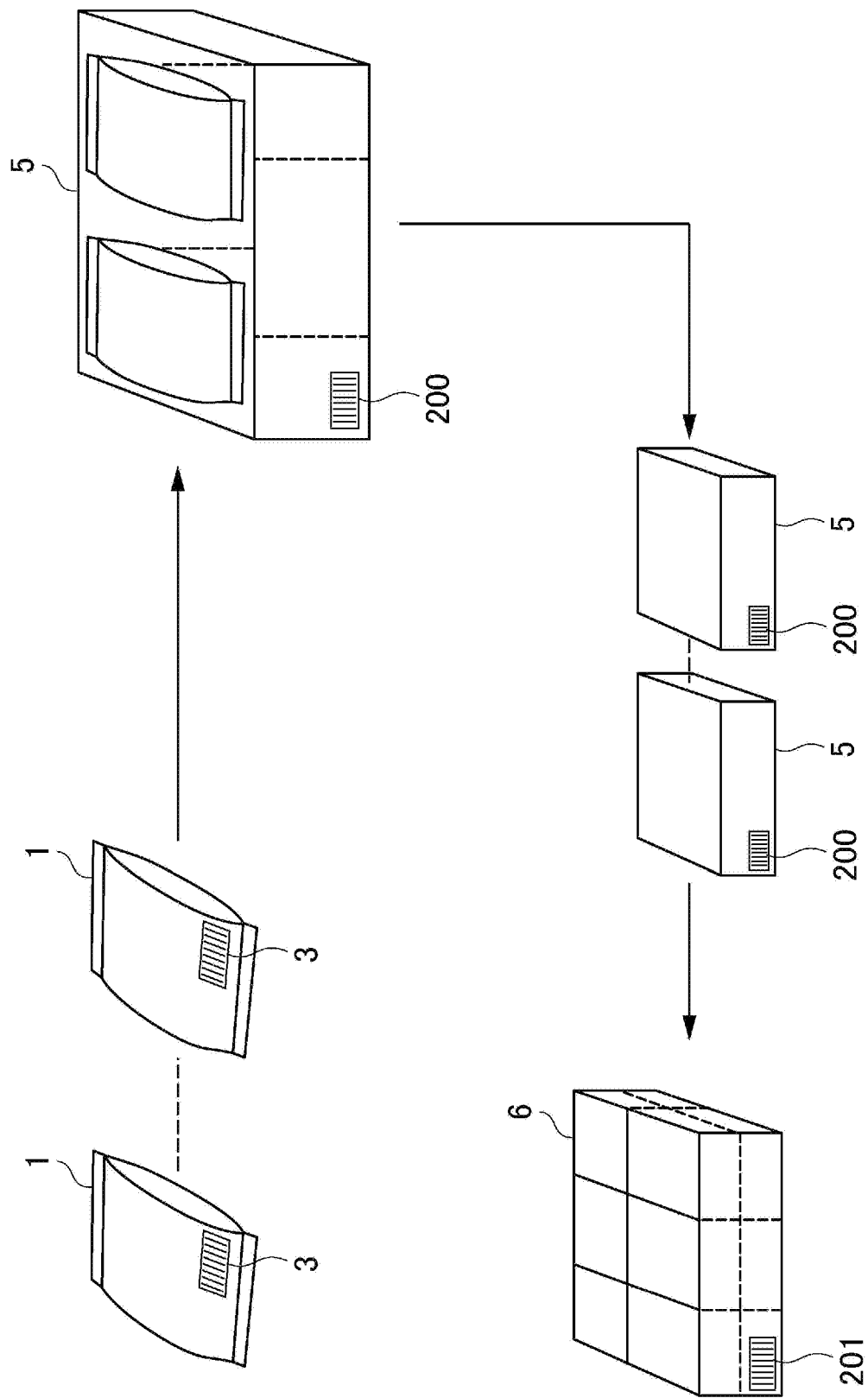

TRADING CARD PACKAGE AND MANUFACTURING METHOD FOR SAME

CROSS-REFERENCE TO RELATED APPLICATION

The present application claims priority to JP Application No. 2018-063103 filed Mar. 11, 2018, which is incorporated herein by reference in its entirety.

FIELD OF THE INVENTION

The present invention relates to a trading card used in a trading card game and, more particularly, to a trading card package that has a plurality of rareness degrees and is classified into any one of the rareness degrees, information concerning the rareness degree being printed on the trading card package, and is individually packed in a combination conforming to predetermined rules and a manufacturing method for the trading card package.

BACKGROUND

Some trading cards have a high rareness degree and are purchased at a high price. The trading card having the high rareness degree is likely to be stolen or replaced and repackaged in a process of sales. In that case, even if such an illegal act is committed, the illegal act cannot be found because an original combination of packages is unknown.

For example, AU 2008330607 (Patent Literature 1) discloses a packaging method with an ID for specifying a packaged card.

In the packaging method disclosed in Patent Literature 1, a unique ID is attached to a package and the ID and a shuffle machine are associated. However, content of the package cannot be specified by the ID. Therefore, in this mechanism, even if the package is replaced, the replacement cannot be noticed.

SUMMARY OF THE INVENTION

The present invention is to solve the problems described above and an object of the present invention is to provide a trading card package and a manufacturing method for the trading card package that link a combination of enclosed trading cards and a package ID to eliminate room for illegal acts such as replacement and forgery.

In order to achieve the object, a manufacturing method for a trading card package according to the present invention includes: a grouping step of grouping a predetermined number of trading cards in order to combine the trading cards, which are classified into different rareness degrees, according to predetermined rules and package the trading cards as one package, the trading cards having a plurality of rareness degrees and each being classified into any one of the rareness degrees, and information concerning the rareness degrees being printed on the trading cards; and a packaging step of packaging, in one package, a group of the trading cards grouped in the grouping step.

Trading card IDs are imparted to the trading cards. In the grouping step, the trading cards are selected to form a group to group, in the group of the predetermined number of trading cards forming the group, the trading cards classified into a plurality of different rareness degrees according to the predetermined rules, and the trading card IDs of the selected trading cards are registered in a database.

A package ID for specifying the package is imparted to the package for each package. A code display representing the package ID is enclosed in the package or provided on the package.

The package ID of the package including the trading cards and the trading card IDs and the rareness degrees of the trading cards included in the package are associated in the database.

In order to achieve the object, in a package in which trading cards are classified into predetermined rareness degrees according to the present invention, information concerning the rareness degrees into which the trading cards are classified is respectively imparted to the trading cards.

A predetermined number of trading cards are grouped in order to combine, according to predetermined rules, the trading cards classified into different rareness degrees and package the trading cards in one package.

The grouped trading cards are packaged in one package.

Trading card IDs are imparted to the trading cards. In the group of the predetermined number of trading cards forming the group, the trading cards classified into a plurality of different rareness degrees are grouped according to the predetermined rules, and the trading card IDs of a plurality of trading cards in the group are registered in a database.

A package ID for specifying the package is imparted to the package for each package. A code display representing the package ID is enclosed in the package or provided on the package.

The package ID of the package including the trading cards and the trading card IDs of the trading cards included in the package are associated in the database.

According to the present invention, a trading card package and content of the trading card package are linked and the content can be specified. Therefore, it is possible to provide a trading card with which an illegal act can be found.

BRIEF DESCRIPTION OF THE DRAWINGS

FIG. 3 is a schematic configuration diagram showing steps until trading cards are grouped and packaged in a manufacturing process of the trading cards according to the embodiment of the present invention.

FIG. 4 is an explanatory diagram showing a state in which the trading cards according to the embodiment of the present invention are packaged, boxed in an inner box, stacked on a carton, and carried.

DETAILED DESCRIPTION OF THE PREFERRED EMBODIMENTS

A trading card package and a manufacturing method for the trading card package according to an embodiment of the present invention are explained below with reference to the drawings.

In a manufacturing process for trading cards 4 according to this embodiment, it is desirable that consistent process management from order reception to shipment is performed by a process management system 400. In this embodiment, a manufacturing process using such a process management system 400 is explained. The process management system 400 is configured by a computer including a program.

Figure 1:
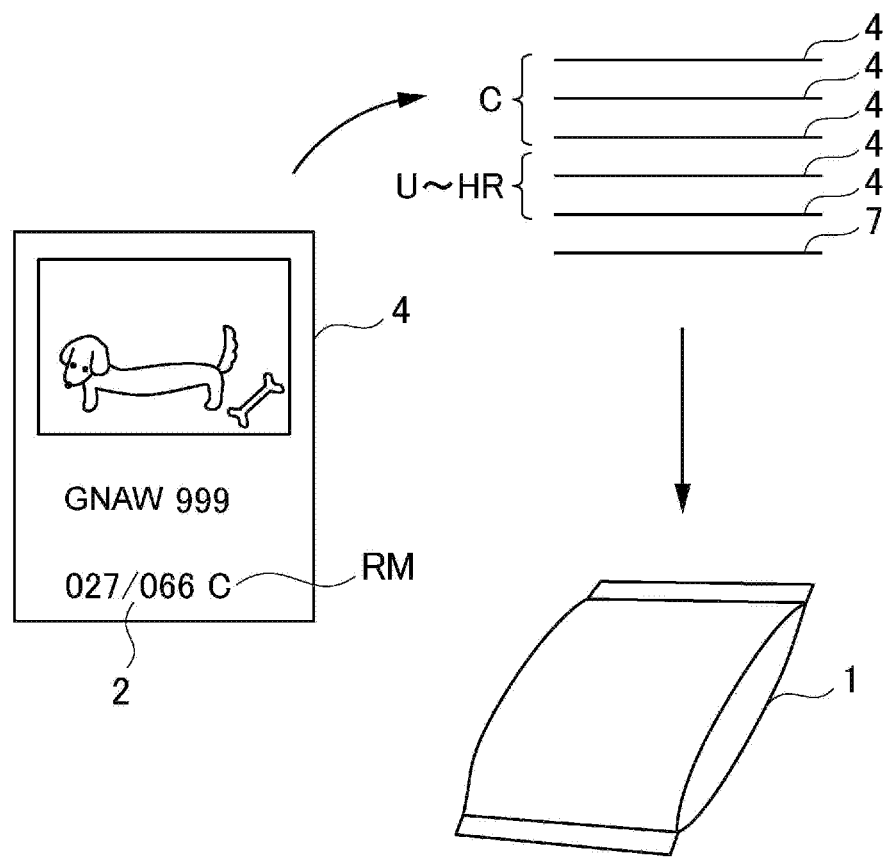
FIG. 1 is an explanatory diagram showing a state in which a plurality of trading cards having a plurality of rareness degrees according to an embodiment of the present invention are packaged.

FIG. 1 is a diagram showing a state in which a plurality of trading cards according to this embodiment are packaged. The trading cards in the present invention are classified into predetermined rareness degrees RM. Information concerning the rareness degrees RM to which the trading cards are classified is respectively imparted to the trading cards. The trading cards classified into different rareness degrees RM are combined according to predetermined rules and packaged in one package 1.

As the rareness degrees RM of the trading cards according to this embodiment are higher, the trading cards have higher values in a game. Types of the rareness degrees RM are different depending on games. Types of the rareness degrees RM in this embodiment are five types, that is, common (C) that is most general and has a lowest rareness degree RM, uncommon (U) that has the rareness degree RM higher than the rareness degree RM of C, rare (R) that has the rareness degree RM higher than the rareness degree RM of U, super rare (SR) that has the rareness degree RM higher than the rareness degree of R, and hyper rare (HR) that has the highest rareness degree RM.

Figure 2:
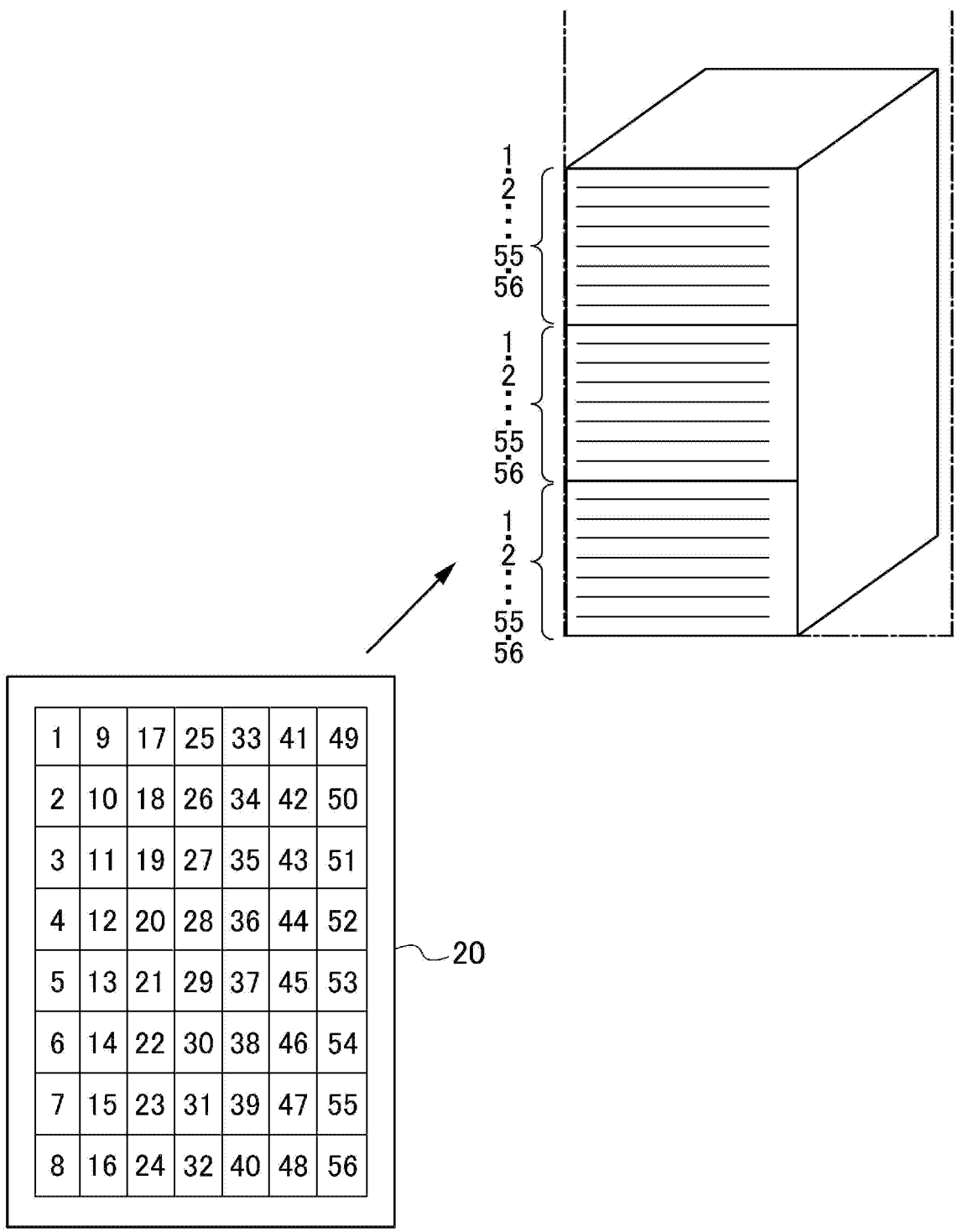
FIG. 2 is an explanatory diagram showing a state in which a trading card according to the embodiment of the present invention is printed on a card base sheet and the printed trading card is set in a deposit cylinder.

FIG. 2 shows a state in which a front pattern of the same rareness degree RM is printed for each base sheet in a predetermined layout on one surface of a card base sheet 20 according to this embodiment, a rear pattern is printed on the rear surface, and a printed card base sheet is cut into individual cards by a cutter and thereafter deposited in deposit cylinders 101 in order of the layout on the card base sheet (in FIG. 2, order of 1 to 56 are repeatedly set three or more times). Therefore, the trading cards 4 are repeatedly set in the deposit cylinders 101 in order in which the trading cards 4 should be taken out. The trading cards 4 having the same rareness degree RM are printed on the same card base sheet. However, different front patterns are respectively printed on the trading cards 4.

Grouping and packaging processes in the embodiment of the present invention are explained.

FIG. 3 is a diagram showing a schematic configuration of a manufacturing method centering on a grouping machine 100 used in packaging the trading cards 4 in a process for manufacturing the trading cards 4 according to this embodiment. As shown in FIG. 3, the grouping machine 100 includes deck deposit cylinders 101, a belt conveyor 102, belt conveyor moving rollers 103, a card receiving section 104, and cameras 105. In a deck deposit cylinder 101a in FIG. 3, the trading cards 4 of the common C are set in the same layout order as in FIG. 1. Similarly, the trading cards of the uncommon U are set in a deposit cylinder 101b, the trading cards of the rare R are set in a deposit cylinder 101c, the trading cards of the super rare SR are set in a deposit cylinder 101d, and the trading cards of the hyper rare HR are set in a deposit cylinder 101e.

In the configuration shown in FIG. 3, a configuration in which the deck deposit cylinders 101 include six cylinders is illustrated. However, the number of cylinders is optional. A deck of a card 7 imparted with a package ID 3 is set in the most downstream cylinder (a deck deposit cylinder 101f in FIG. 3). However, the package ID 3 may be attached to only the package 1. The card 7 imparted with the package ID 3 may be enclosed in the package 1 and the package ID 3 may be attached to the package 1 itself. When a trading card is set, the belt conveyor 102 slides according to rotation of the rollers 103. The trading cards 4 are discharged onto the belt conveyor 102 from the deck deposit cylinders 101. The number of trading cards to be discharged and a distribution of the rareness degrees RM of the discharged trading cards are determined beforehand in all cylinder sets. A predetermined number of trading cards 4 are discharged at predetermined timings from discharging devices 301a to 301f attached to the respective deposit cylinders 101 according to signals from a trading-card-discharge managing device 300. For example, when the trading cards enter as shown in FIG. 1, three trading cards are discharged from the deposit cylinder 101a in FIG. 3. Two trading cards in total are discharged from the deposit cylinders 101b to 101e at a predetermined probability. Finally, one card 7 imparted with the package ID 3 is discharged from the deposit cylinder 101f. Six cards in total are discharged and packaged.

In the deck deposit cylinders 101, the trading cards are set such that the front surfaces of the trading cards face upward (the cameras 105 side). Every time one card 4 is dropped to the belt conveyor 102 by the discharging devices 301a to 301f, the cameras 105 acquire images of the card 4. The acquired images are sent to a database DB.

In the grouping machine 100, the image of the card surface photographed by the cameras 105 is subjected to image analysis processing in an image processing section of the process management system 400 that manages a manufacturing line including the grouping machine 100. A trading card ID 2 of the card dropped from the deck deposit cylinders 101 to the belt conveyor 102 is detected by the image analysis processing. That is, in the grouping machine 100, every time a card is dropped from the deck deposit cylinders 101, an ID (the card ID 2) of the card is detected. It is confirmed whether cards are discharged from the respective cylinders in predetermined order and are discharged according to predetermined rules. Further, this is recorded in the database DB.

The predetermined rules are: for example, not all of five cards are discharged from one deposit cylinder 101, different patterns are laid out on card base sheets, the cards are discharged in layout order, and, therefore, cards having the same pattern are not continuously discharged. As an example of the predetermined rules, the predetermined rules are different depending on trading card games. For example, the number of enclosed cards per one inner box is eleven to twelve in the common C, four in the uncommon U, one to two in the rare R, and zero to two in the super rare SR and the hyper rare HR. Further, the number of enclosed cards per one carton is 132 to 144 in the common C, forty-eight in the uncommon U, twelve to twenty-four in the rare R, and one to twenty-four in the super rare SR and the hyper rare HR.

FIG. 4 is an explanatory diagram showing a state in which a plurality of packages 1 (e.g., thirty packages) in which the trading cards 4 according to this embodiment are packaged are collected and boxed in one inner box 5 and twelve inner boxes 5 are collected and enclosed in one carton.

A manufacturer of the trading cards 4 classifies the rareness degrees RM and inputs information concerning the classified rareness degrees RM to the process management system 400. An input method for the information is optional. In the embodiment, the rareness degrees RM are attached to the cards. However, the rareness degrees RM may not be attached to the cards and may be present only on the database DB. In a grouping process for grouping a predetermined number of trading cards, the manufacturer of the trading cards 4 selects trading cards and forms a group to group, according to the predetermined rules, the trading cards 4 classified into different rareness degrees RM. The manufacturer inputs the trading card IDs 2 of the selected trading cards to the process management system 400. Further, in a packaging process, the manufacturer of the trading cards 4 inputs the package ID 3 for specifying a package to the process management system 400. Further, in a process for enclosing thirty packages 1 in an inner box 5, the manufacturer boxes the thirty packages 1 in the inner box 5, imparts a peculiar ID 200 (an inner box ID 200) to each inner box, and inputs the inner box IDs 200 to the process management system 400. Further, in a process for enclosing twelve inner boxes 5 in a carton 6, the manufacturer imparts a peculiar ID 201 (carton ID) to each carton, and inputs the carton IDs 201 to the process management system 400. Predetermined information among the information input in the processes in this way is associated with the trading card ID 2 on the database DB of the process management system 400 as explained below. The database DB may be provided in the process management system 400 or may be provided outside the process management system 400. The respective IDs are registered in the database DB in this way. Consequently, when some defect is found later, it is possible to specify content of a defective product by performing a database DB search on the basis of the IDs.

In the inner box boxing processing, a predetermined number of packages 1 are packed in one inner box. At this time, by reading the package IDs 3 of the packages 1 in the inner box with a camera, it is possible to easily register the package IDs 3 of the packages 1 packed in one inner box in the database DB of the process management system 400. When reading of barcodes 3 of all the packages 1 in one inner box is completed, the process management system 400 may generate an ID for specifying the inner box (an inner box ID 200) and print a barcode representing the inner box ID on a seal. It is possible to perform management in units of the inner box by sticking the seal to the inner box. The generated inner box ID is registered in the database DB in association with the package ID 3 of the package 1 packed in the inner box.

Similarly, when a predetermined number of inner boxes 5 are loaded on one carton 6 and a plurality of inner boxes are packed in the carton, the inner box IDs 200 may be read by a barcode reader from all the inner boxes loaded on the one carton and the read inner box IDs 200 may be registered in the database DB of the process management system 400 in association with an ID (the carton ID 201) for specifying the carton. At this time, when the barcode reading from all the inner boxes in the one carton is completed, the process management system 400 generates an ID (the carton ID 201) for specifying the carton and prints a barcode representing the carton ID on a seal. It is possible to perform management in units of the carton by sticking the seal to the carton.

Further, when a predetermined number of cartons are loaded on a pallet and a plurality of cartons are stacked on the pallet, the carton IDs 201 may be read by the barcode reader from all the cartons loaded on the one pallet and the read carton IDs 201 may be registered in the database DB of the process management system 400 in association with an ID (a pallet ID) for specifying the pallet. At this time, when the barcode reading from all the cartons in one pallet is completed, the process management system 400 generates an ID (a pallet ID) for specifying the pallet and prints a barcode representing the pallet ID on a seal. It is possible to perform management in units of the pallet by sticking the seal to the pallet.

As explained above, it is possible to perform the management in units of the inner box and in units of the carton by not only attaching the trading card ID 2 and the package ID 3 but also attaching the inner box ID 200 and the carton ID 201 to the inner box, the carton, and the like. That is, for example, when some defect is found in certain one trading card 4, it is possible to retrieve, on the basis of the trading card ID 2 of the trading card 4, from the database DB, IDs of a package, an inner box, and a carton in which the trading card 4 is stored. It is also possible to perform disposal in units of the package, the inner box, and the carton in which the defective trading card 4 is stored. Conversely, it is possible to learn, from the carton ID 201, all the inner box IDs 200 and the trading card IDs 2 of inner boxes and trading cards stored in the carton having the carton ID 201.

An inspecting step in this embodiment is explained. The inspecting step is performed by the process management system 400. In this embodiment, the inspecting step includes a step of inspecting, from the trading card IDs 2 and the rareness degrees RM of the trading cards 4 included in the package 1, the inner box 5, or the carton 6, whether the number and the group of the trading cards 4 in the package 1 are a number and a group conforming to the predetermined rules, a step of inspecting, in a state in which the group of the trading cards 4 included in the package 1, the inner box 5, or the carton 6 is included in the package 1, from weight or thickness, whether the number of the trading cards 4 in the package 1 is the number conforming to the predetermined rules, and a step of reading the carton ID 201 to thereby specify the inner box ID 200 and the package ID 3 and further specify how many trading cards 4 having predetermined rareness degrees RM are stored in the carton 6 and inspecting whether the rareness degrees RM of the trading cards 4 are set according to a predetermined ratio.

The grouping machine 100 illustrated in the embodiment is only an example. A specific configuration of the grouping machine is not limited to the example. For example, a configuration for discharging cards from the deposit cylinders 101 is not limited to the deposit cylinder and the rollers explained above and may be a configuration in which the cards are taken out by a mechanism such as a robot arm.

In this embodiment, the trading card ID and the ID of the package, the inner box, or the carton related to the trading card 4 are registered in the database DB in association with each other. Consequently, the following advantages are obtained.

For example, when a customer who purchases the package 1 notices that the purchased trading card 4 has some defect, the customer informs the manufacturer of the trading card 4 of the package ID 3. At this time, the customer may send, to the manufacture, the package 1 on which the package ID 3 is printed or the trading card 4. The manufacturer may read the package ID 3. Alternatively, the customer may read the package ID 3 with a barcode reader or the like and transmit read data to the manufacturer with communication means such as an electronic mail. Consequently, the manufacture can find, by searching through the database DB on the basis of the package ID 3, the five trading card IDs 2 that should be originally included in the package 1. The manufacturer can specify authenticity and a defect of the trading card 4 in the package 1 by collating an ID on the database DB and an ID of the trading card 4 actually included in the package 1.

In delivery, the manufacturer may download data (a trading card ID and information associated with the trading card ID) concerning a delivery target package 1 from the database DB to a portable storage medium and deliver the package 1 attached with the storage medium to the customer. A data structure (a format) of the download data from the database DB to the storage medium is optional on condition that the data can be referred to in a computer of the customer. In this case, when the customer finds a defect such as a bend of the trading card 4, the customer can inform the manufacturer of the package ID 3. The manufacturer can read the package ID 3 of the defective package 1 with a barcode reader or the like and retrieve data on the storage medium on the basis of the read package ID 3. Even if the trading card 4 is mixed in a delivered product to the customer or the trading card 4 is plucked out from the delivered product for an illegal purpose, if the manufacturer can find, by collating and checking the package ID 3 stored in the storage medium and the trading card ID 2 of the delivered product, that there is the trading card 4 having a trading card ID absent in a storage medium provided during the delivery or the trading card 4 having a trading card ID that should be present is absent, the manufacturer can determine that the trading card 4 is mixed or is plucked out for the illegal purpose. Consequently, it is possible to prevent an outsider from mixing an illegal product or plucking out the trading card 4.

The embodiment of the present invention is explained above. However, the technical scope of the present invention covers the following notes.

A manufacturing method for a trading card package, the manufacturing method including: a front surface printing step of printing a front pattern of a trading card on one surface of a base sheet; a rear surface printing step of printing a rear pattern on another surface of the base sheet; a step of cutting, with a cutter, a printed card base sheet having undergone both of the front surface printing step and the rear surface printing step into individual trading cards; a grouping step of classifying the individual trading cards cut in the cutting step into any one of rareness degrees RM and grouping a predetermined number of trading cards in order to combine the trading cards on which information concerning the rareness degrees RM is printed, the trading cards being classified into different rareness degrees, according to predetermined rules and package the trading cards as one package; and a packaging step of packaging, in one package, a group of the trading cards grouped in the grouping step.

Trading card IDs are imparted to the trading cards. In the grouping step, the trading cards are selected to form a group to group, in the group of the predetermined number of trading cards forming the group, the trading cards classified into a plurality of different rareness degrees RM according to the predetermined rules, and the trading card IDs of the selected trading cards are registered in a database DB.

A package ID for specifying the package is imparted to the package for each package. A code display representing the package ID is enclosed in the package or provided on the package.

The package ID of the package including the trading cards and the trading card IDs and the rareness degrees RM of the trading cards included in the package are associated in the database DB.

The respective trading card IDs are read when the trading cards are grouped in the grouping step or before the group of the trading cards is packaged in the packaging step or during the packaging.

The manufacturing method further includes a boxing step of enclosing a plurality of the packages having undergone the packaging step in an inner box.

A unique inner box ID different for each inner box is imparted to the inner box enclosing the plurality of packages. Package IDs of the plurality of packages included in the inner box and the inner box ID are associated in the database DB.

The manufacturing method further includes a packing step of packing a plurality of the inner boxes in a carton.

A unique carton ID different for each carton is imparted to the carton.

The carton ID and inner box IDs of the plurality of inner boxes included in the carton are associated in the database DB.

The manufacturing method may further include an inspecting step of inspecting, from the trading card IDs and the rareness degrees RM of the trading cards included in the package, the inner box, or the carton, whether a number and a group of the trading cards in the package are a number and a group conforming to the predetermined rules.

The manufacturing method may further include an inspecting step of inspecting, in a state in which the group of the trading cards included in the package, the inner box, or the carton is included in the package, from weight or thickness, whether a number of the trading cards in the package is a number conforming to the predetermined rules.

The manufacturing method may further include a step of reading the carton ID to thereby specify the inner box ID and the package ID and further specify how many trading cards having predetermined rareness degrees RM are respectively included in the carton and inspecting whether the rareness degrees RM of the trading cards are set according to a predetermined ratio.

The trading card ID, the package ID, or the inner box ID may be an RFID.

The trading card ID, the package ID, or the inner box ID may be an RFID. The manufacturing method may further include a step of inspecting, when the carton ID is read from an outside, whether a combination of the trading cards in the carton is correct.

The package may be an opaque package to prevent content of the package from being seen.

The package may include a fixed explanation card or extra card. The package ID 3 may be imparted to the package, the explanation card, or the extra card. The package ID 3 and all other cards in the package may be associated. The package ID 3 may be associated with a predetermined online game system in an online and may be usable in the online game.

By reading the carton ID and the inner box ID, at least one of the following may be grasped: (1) which ID is sold to which customer when a trading card is shipped; (2) When a claim is received from a customer, whether a trading card is shipped by the company; (3) whether a trading card is taken out, although the trading card is not shipped; and (4) whether a trading card is discarded when the trading card is discarded.

A manufacturing method for a trading card package, the manufacturing method including: a front surface printing step of printing a front pattern of a trading card on one surface of a base sheet; a rear surface printing step of printing a rear pattern on another surface of the base sheet; and a step of cutting, with a cutter, a printed card base sheet having undergone both of the front surface printing step and the rear surface printing step into individual trading cards.

The individual trading cards cut in the cutting step are classified into predetermined rareness degrees RM and information concerning the rareness degrees RM to which the trading cards are classified is respectively imparted to the trading cards.

A predetermined number of the trading cards are grouped in order to combine, according to predetermined rules, the trading cards classified into different rareness degrees RM and package the trading cards as one package.

The grouped trading cards are packaged in one package.

Trading card IDs are imparted to the trading cards. The trading cards classified into a plurality of different rareness degrees RM according to the predetermined rules are grouped in the group of the predetermined number of trading cards forming the group. The trading card IDs of a plurality of the trading cards are registered in a database DB.

A package ID for specifying the package is imparted to the package for each package. A code display representing the package ID is enclosed in the package or provided on the package.

The package ID of the package including the trading cards and the trading card IDs of the trading cards included in the package are associated in the database DB.

A plurality of the packaged packages may be enclosed in an inner box.

The manufacturing method may further include a step of imparting a unique inner box ID different for each inner box to the inner box enclosing the plurality of packages. Package IDs of the plurality of packages included in the inner box and the inner box ID may be associated in the database DB.

A plurality of the inner boxes may be packed in a carton.

The manufacturing method may further include a step of imparting a unique carton ID different for each carton to the carton.

The carton ID and inner box IDs of the plurality of inner boxes included in the carton may be associated in the database DB.

The manufacturing method may further include a step of inspecting, from the trading card IDs and the rareness degrees RM of the trading cards included in the package, the inner box, or the carton, whether a number and a group of the trading cards in the package are a number and a group conforming to the predetermined rules.

The manufacturing method may further include a step of reading the carton ID to thereby specify the inner box ID and the package ID and further specify how many trading cards having predetermined rareness degrees RM are respectively included in the carton and inspecting whether the rareness degrees RM are set according to a predetermined ratio.

The trading card ID, the package ID, or the inner box ID may be an RFID.

The trading card ID, the package ID, or the inner box ID may be an RFID. The manufacturing method may further include a step of inspecting, when the carton ID is read from an outside, whether a combination of the trading cards in the carton is correct.

The package may be an opaque package to prevent content of the package from being seen.

The package may include a fixed explanation card or extra card. The package ID 3 may be imparted to the package, the explanation card, or the extra card. The package ID 3 and all other cards in the package may be associated. The package ID 3 may be associated with a predetermined online game system on the online and may be usable in the online game.

By reading the carton ID and the inner box ID, at least one of the following may be grasped: (1) which ID is sold to which customer when a trading card is shipped; (2) When a claim is received from a customer, whether a trading card is shipped; (3) whether a trading card is taken out, although the trading card is not shipped; and (4) whether a trading card is discarded when the trading card is discarded.

The present invention has industrial applicability as a trading card package, content of which is specified, and a manufacturing method for the trading card package.

REFERENCE SIGNS LIST

| | |
|---|---|
| 1 | package |
| 2 | trading card ID |
| 3 | package ID |
| 4 | trading card |
| 5 | inner box |
| 6 | carton |
| 7 | card with a package ID |
| 20 | card base sheet |
| 100 | grouping machine |
| 101 | deposit cylinder |
| 102 | belt conveyor |
| 103 | roller |
| 104 | card receiving section |
| 105 | camera |
| 200 | inner box ID |
| 201 | carton ID |
| 300 | discharge managing device |
| 301 | discharging device |
| 400 | process management system |
| RM | rareness degree |
| DB | database |

What is claimed is:

1. A manufacturing method for a trading card package comprising:
    a grouping step of grouping a predetermined number of trading cards to combine the trading cards, which are classified into different rareness degrees, according to predetermined rules and package the trading cards as one package, the trading cards having a plurality of rareness degrees and each being classified into any one of the rareness degrees, and information concerning the rareness degrees being printed on the trading cards; and
    a packaging step of packaging, in one package, a group of the trading cards grouped in the grouping step,
    wherein, in the grouping step:
        the trading cards are physically selected and combined to group, in the group of the predetermined number of trading cards forming the group, the trading cards classified into a plurality of different rareness degrees, according to the predetermined rules; and
        after physical selection of at least one trading card of the trading cards combined to form the group, content information of the combination is registered in a database based on the at least one trading card physically selected;
    wherein the predetermined rules include that at least one rareness degree of a plurality of the trading cards included in a predetermined number of packages that are collectively handled is present in a predetermined number,
    a package ID for specifying the package is imparted to the package for each package, and a code display representing the package ID is enclosed in the package or provided on the package,
        the package ID of the package including the trading cards and the content information of the combination of the trading cards included in the package are associated in the database, the package ID is a unique ID value,
    whether the plurality of trading cards included in the predetermined number of packages conform to the rules is able to be inspected by referring to the database, and
    authenticity of the trading cards is able to be determined by referring to the package ID in the database.

2. The manufacturing method for the trading card package according to claim 1, wherein
trading card IDs are imparted to the trading cards,
in the grouping step, the trading card IDs of the trading cards forming the group are registered in the database, and
the package ID and the trading card IDs and the rareness degrees of the trading cards included in the package are associated in the database.

3. The manufacturing method for the trading card package according to claim 2, wherein the respective trading card IDs are read when the trading cards are grouped in the grouping step or before the group of the trading cards is packaged in the packaging step or during the packaging.

4. The manufacturing method for the trading card package according to claim 2, further comprising an inspecting step of inspecting, from the trading card IDs and the rareness degrees of the trading cards included in the package, whether a number and a group of the trading cards in the package are a number and a group conforming to the predetermined rules.

5. The manufacturing method for the trading card package according to claim 1, further comprising:
a boxing step of enclosing a plurality of packages having undergone the packaging step in an inner box, and
wherein a unique inner box ID different for each inner box is imparted to the inner box enclosing the plurality of packages, and package IDs of the plurality of packages included in the inner box and the inner box ID are associated in the database.

6. The manufacturing method for the trading card package according to claim 5, further comprising a packing step of packing a plurality of inner boxes in a carton, wherein
a unique carton ID different for each carton is imparted to the carton, and
the carton ID and inner box IDs of the plurality of inner boxes included in the carton are associated in the database.

7. The manufacturing method for the trading card package according to claim 6, further comprising an inspecting step of inspecting, from trading card IDs and the rareness degrees of all the trading cards included in the inner box, whether a combination of a number and rareness degrees of the trading cards in the inner box is a combination of a number and rareness degrees conforming to the predetermined rules.

8. The manufacturing method for the trading card package according to claim 6, further comprising an inspecting step of inspecting, from trading card IDs and the rareness degrees of all the trading cards included in the carton, whether a combination of a number and rareness degrees of the trading cards in the carton is a combination of a number and rareness degrees conforming to the predetermined rules.

9. The manufacturing method for the trading card package according to claim 6, further comprising an inspecting step of inspecting, from weight in a state in which all the trading cards included in the carton are included in the carton, whether a number of the trading cards in the carton is a number conforming to the predetermined rules.

10. The manufacturing method for the trading card package according to claim 5, further comprising an inspecting step of inspecting, from weight in a state in which all the trading cards included in the inner box are included in the inner box, whether a number of the trading cards is a number conforming to the predetermined rules.

11. The manufacturing method for the trading card package according to claim 1, further comprising an inspecting step of inspecting, in a state in which the group of the trading cards included in the package is included in the package, from weight or thickness, whether a number of the trading cards in the package is a number conforming to the predetermined rules.

12. A trading card package, comprising:
trading cards are classified into predetermined rareness degrees, and information concerning the rareness degrees into which the trading cards are classified is respectively imparted to the trading cards,
a predetermined number of trading cards are grouped in order to combine, according to predetermined rules, the trading cards classified into different rareness degrees and package the trading cards in one package,
the grouped trading cards are packaged in one package,
wherein in the group of the predetermined number of trading cards forming the group, the trading cards classified into a plurality of different rareness degrees are combined according to the predetermined rules, and after physical selection of at least one trading card of the trading cards combined to form the group, content information of the combination is registered in a database based on physical selection of the at least one trading card of the trading cards combined to form the group,
the predetermined rules include that at least one rareness degree of a plurality of the trading cards included in a predetermined number of packages that are collectively handled is present in a predetermined number,
a package ID for specifying the package is imparted to the package for each package, and a code display representing the package ID is enclosed in the package or provided on the package,
the package ID of the package including the trading cards and the content information of the combination included in the package are associated in the database, the package ID is a unique ID value,
whether the plurality of trading cards included in the predetermined number of the packages conform to the rules is able to be inspected by referring to the database, and
authenticity of the trading cards is able to be determined by referring to the package ID in the database.

13. The trading card package according to claim 12, wherein:
trading card IDs are imparted to the trading cards, and the trading card IDs of a plurality of the trading cards in the group are registered in the database, and
the package ID of the package including the trading cards and the trading card IDs included in the package are associated in the database.

14. The trading card package according to claim 13, further comprising:
a plurality of the packaged packages enclosed in an inner box, and
wherein a unique inner box ID different for each inner box is imparted to the inner box enclosing the plurality of packages, and package IDs of the plurality of packages included in the inner box and the inner box ID are associated in the database.

15. The trading card package according to claim 14, further comprising:
a plurality of inner boxes packed in a carton,
a unique carton ID different for each carton is imparted to the carton, and wherein the carton ID and inner box IDs of the plurality of inner boxes included in the carton are associated in the database.

16. The trading card package according to claim 15, wherein it is inspected, from the trading card IDs and the rareness degrees of all the trading cards included in the carton, whether a combination of a number and rareness degrees of the trading cards in the carton is a combination of a number and rareness degrees conforming to the predetermined rules.

17. The trading card package according to claim 13, wherein it is inspected, from the trading card IDs and the rareness degrees of the trading cards included in the package, whether a number and a group of the trading cards in the package are a number and a group conforming to the predetermined rules.

18. The trading card package according to claim 13, wherein it is inspected, from the trading card IDs and the rareness degrees of all the trading cards included in an inner box, whether a combination of a number and rareness degrees of the trading cards in the inner box is a combination of a number and rareness degrees conforming to the predetermined rules.

* * * * *